(12) United States Patent
Sassi et al.

(10) Patent No.: US 9,428,039 B2
(45) Date of Patent: Aug. 30, 2016

(54) MOTOR VEHICLE PROVIDED WITH A PROTECTIVE TARPAULIN SYSTEM

(71) Applicants: Andre Sassi, Rueil Malmaison (FR); Jocelyne Sassi, Rueil Malmaison (FR)

(72) Inventors: Andre Sassi, Rueil Malmaison (FR); Jocelyne Sassi, Rueil Malmaison (FR)

(*) Notice: Subject to any disclaimer, the term of this patent is extended or adjusted under 35 U.S.C. 154(b) by 0 days.

(21) Appl. No.: 14/769,839

(22) PCT Filed: Feb. 21, 2014

(86) PCT No.: PCT/FR2014/050356
§ 371 (c)(1),
(2) Date: Oct. 6, 2015

(87) PCT Pub. No.: WO2014/128413
PCT Pub. Date: Aug. 28, 2014

(65) Prior Publication Data
US 2016/0009166 A1    Jan. 14, 2016

(30) Foreign Application Priority Data
Feb. 25, 2013   (FR) ...................................... 13 51628

(51) Int. Cl.
B60J 11/00    (2006.01)
B60J 11/02    (2006.01)
B60J 11/04    (2006.01)

(52) U.S. Cl.
CPC ................. *B60J 11/02* (2013.01); *B60J 11/04* (2013.01)

(58) Field of Classification Search
CPC .................................. B60J 11/02; B60J 11/04
USPC ........ 296/98, 136.01, 136.04, 136.1, 136.11, 296/136.12
See application file for complete search history.

(56) References Cited

U.S. PATENT DOCUMENTS

2009/0140541 A1*  6/2009  Suh .......................... B60J 11/00
                                                        296/136.01
2012/0146358 A1    6/2012  Sassi et al.

FOREIGN PATENT DOCUMENTS

| CN | 1 076 675 C | 12/2001 |
| CN | 101 870 254 A | 10/2010 |
| CN | 201 922 907 U | 8/2011 |
| FR | 2 947 489 A1 | 1/2011 |
| WO | 91/06443 A1 | 5/1991 |
| WO | 2011/004105 A1 | 1/2011 |

OTHER PUBLICATIONS

International Search Report for PCT/FR2014/050356 dated May 9, 2014.
International Preliminary Report on Patentability dated Sep. 3, 2015 issued in counterpart international application No. PCT/FR2014/050356.

* cited by examiner

*Primary Examiner* — Dennis H Pedder
(74) *Attorney, Agent, or Firm* — Sughrue Mion, PLLC

(57) ABSTRACT

A motor vehicle (V), the vehicle including an outer body (E) and provided with a protective tarpaulin system including a flexible tarpaulin (1) for covering the outer body (E) at least in part. The tarpaulin (1) is windable around a drum (2) between a wound-in storage position and a wound out position. The tarpaulin includes a connection edge secured to the drum, and an opposite edge that is free. The free edge of the flexible tarpaulin includes at least one traction element (13) made of ferromagnetic material; and the vehicle (V) includes at least one magnet (4) movable under the outer body (E), the magnet (4) attracting the traction element (13) of the tarpaulin through the outer body (E) and entraining the traction element (13) of the tarpaulin, so as to bring the tarpaulin into the wound-out position of the tarpaulin by sliding over the outer body (E).

11 Claims, 2 Drawing Sheets

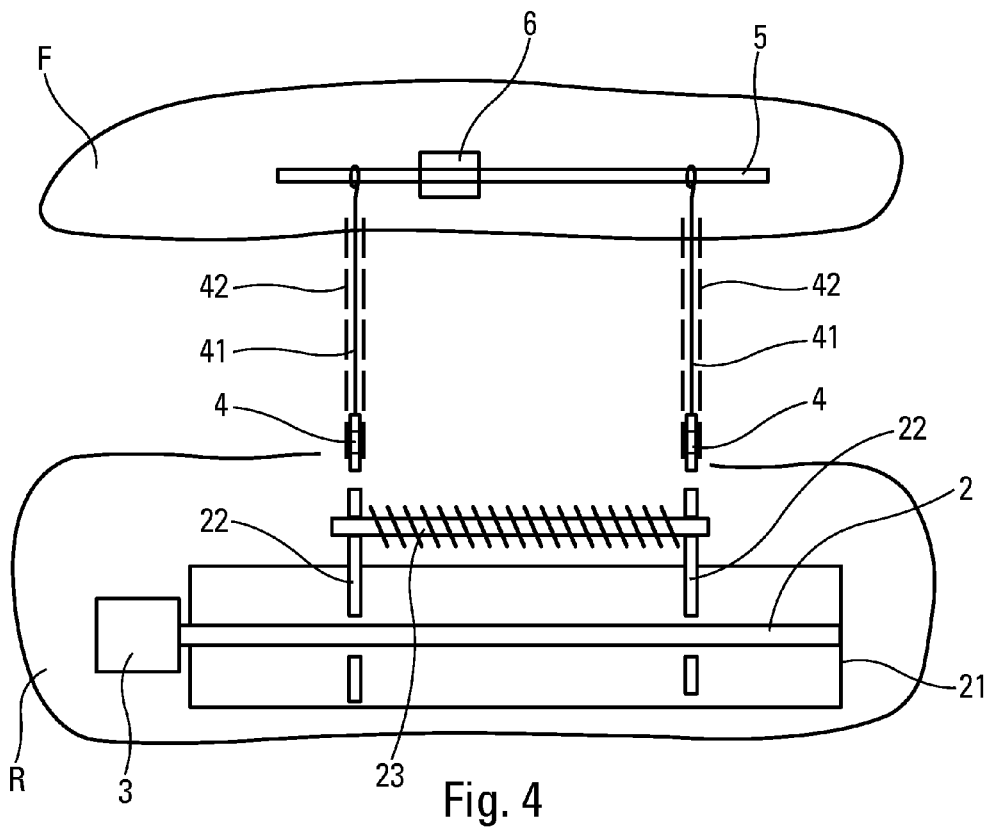
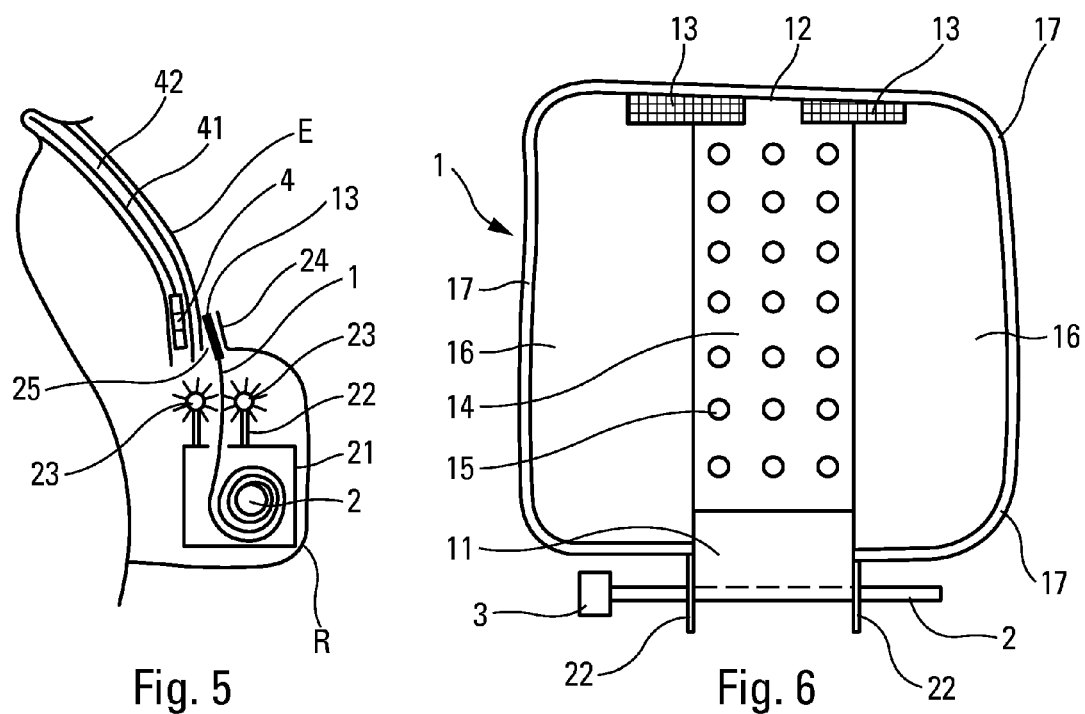

MOTOR VEHICLE PROVIDED WITH A PROTECTIVE TARPAULIN SYSTEM

CROSS REFERENCE TO RELATED APPLICATIONS

This application is a National Stage of International Application No. PCT/FR2014/050356 filed Feb. 21, 2014, claiming priority based on French Patent Application No. 1351628 filed Feb. 25, 2013, the contents of all of which are incorporated herein by reference in their entirety.

The present invention relates to a motor vehicle, such as a car, provided with a protective tarpaulin system. The vehicle includes an outer body, a rear bumper, and a front bumper. The protective system comprises a flexible tarpaulin for covering the vehicle body, at least in part, so as to protect it by extending from its rear bumper to its front bumper. The tarpaulin defines a longitudinal direction that extends lengthwise over the vehicle from the rear to the front. In other words, the tarpaulin is extended or pulled in the longitudinal direction so as to cover the vehicle from the rear to the front, or vice versa. Consequently, the advantageous field of application of the present invention is the field of privately-owned cars, but the present invention may also be used with other types of vehicle, e.g. commercial vehicles, trucks, trailers, boats, etc.

Protective tarpaulins for motor vehicles have long been in existence. The simplest models provide only a flexible tarpaulin that is unfolded and pulled over the top of the vehicle so as to cover it, at least in part. Once in place, the tarpaulin may be fastened to the vehicle using various techniques, e.g. rubber bands, hooks, etc. That type of rudimentary protective tarpaulin presents two drawbacks. The first resides in the covering operation that consists in extending the tarpaulin over the top of the vehicle. It is necessary to pass several times around the vehicle in order to position the tarpaulin correctly on the vehicle. The other drawback resides in the storage of the tarpaulin when it is not in use on the vehicle. It is necessary to fold the tarpaulin correctly so that it is as compact as possible. The storage drawback is solved, in part, by more complex protective tarpaulin systems that use a winding drum onto which the protective tarpaulin is wound in its storage position. When it is desired to use the tarpaulin, it is pulled by a free end in such a manner as to wind the tarpaulin out from its winding drum. Such winding drums may be installed at the front or at the rear, or on the roof of the vehicle. It is also possible to incorporate the winding drum inside the rear trunk or boot of the vehicle. However, even with a winding drum, the tarpaulin system does not solve the problem associated with the operation of covering the vehicle with the tarpaulin. It is still necessary to pull on the free end of the tarpaulin and to move about so as to extend the flexible tarpaulin in appropriate manner over the top of the vehicle. In other words, the winding drum is useful and effective during the operation of winding in the tarpaulin or of uncovering the vehicle, but it is of absolutely no use in the operation of winding out the tarpaulin or of covering the vehicle.

In the prior art, document WO2011/004105 is also known, which describes a protective system comprising a tarpaulin that is provided with stiffener elements, in the form of metal strips or inflatable hoses, that extend substantially in the longitudinal direction so as to impart a certain amount of stiffness to the flexible tarpaulin so as to make the operation of covering the vehicle with a tarpaulin easier. A traction cable mounted on a winder makes it possible to pull the tarpaulin during the operation of putting the tarpaulin into place. The stiffener elements increase the thickness of the tarpaulin and turn out to be ineffective, in particular when there is wind.

An object of the present invention is to make the operation of covering the vehicle with tarpaulin easier, so that putting it into place requires little, if any, intervention by the user. Another object of the present invention is to make the operation of covering the vehicle with a tarpaulin easier and automated, but without hindering or complicating the operation of removing the tarpaulin. Still another object of the invention is to make the operation of putting a tarpaulin into place easier, without providing the tarpaulin with a rigid structure that needs to be removed, folded, or retracted by means of complicated mechanisms. Another object is to mask the tarpaulin system as much as possible inside the vehicle.

To achieve the various objects, the present invention proposes a motor vehicle, such as a car, defining a longitudinal direction that extends over the length of the vehicle between a rear bumper and a front bumper, the vehicle including an outer body that extends substantially from one bumper to the other starting from a sill, the vehicle also being provided with a protective tarpaulin system comprising a flexible tarpaulin for covering the outer body of the vehicle at least in part so as to protect it, the system further comprising a winding drum, advantageously installed at the rear bumper of the vehicle, the tarpaulin being windable around the drum between a wound-in storage position and a wound-out position, the tarpaulin including a connection edge that is secured to the drum, and an opposite edge that is free; the motor vehicle being characterized in that the free edge of the flexible tarpaulin includes at least one traction element made of ferromagnetic material, and the vehicle includes at least one movable magnet that is movable under the outer body along a traction path that extends in the longitudinal direction, the movable magnet attracting the traction element of the tarpaulin through the outer body and entraining the traction element of the tarpaulin along the traction path, so as to bring the tarpaulin into the wound-out position of the tarpaulin by sliding over the outer body.

Thus, the tarpaulin is held and guided longitudinally at its free edge fitted with the traction element that follows the movement of the movable magnet by sliding over the outer body under which the movable magnet moves. The term "outer body" means any outer surface of the vehicle, in particular including its hood, its fenders, its roof, and/or its rear trunk or tailgate. The ferromagnetic material of the traction element may be iron, cobalt, or nickel, or even a magnet, preferably a permanent magnet. The movable magnet is preferably a permanent magnet, but it could equally well be an electromagnet.

Advantageously, the traction element is flexible. The traction element may comprise a plurality of distinct ferromagnetic pieces that are connected together in hinged manner. In a variant, the traction element may comprise a flexible woven fabric formed of wires made of ferromagnetic material. Thus, the traction element can not only be wound, but it can also follow the outline of the outer body.

In a practical embodiment, the movable magnet may be connected via a traction cable to a winder that is advantageously arranged at the front bumper. Advantageously, the movable magnet remains secured to the traction element while the traction element is being wound onto the drum, with the traction cable relaxed or under a small amount of tension. Thus, the traction element is always secured to its movable magnet while it is moving over the outer body along the traction path. In other words, the traction element, and as a result the tarpaulin, is guided longitudinally from one bumper to the other by the movable magnet, both during the operation of putting the tarpaulin into place and the operation of removing the tarpaulin. Preferably, two traction elements are provided that are each in magnetic engagement with a respective movable magnet.

In another advantageous aspect of the invention, the vehicle may include a guide channel in which the movable magnet is moved, the guide channel extending under the outer body of the vehicle, in its direct proximity. The movable magnet may be moved by means of a traction cable as described above, or by any other means.

In order to enable the magnetic field to propagate well, it is preferable for the outer body to be non-ferromagnetic, advantageously being made out of aluminum or out of plastics or composite material.

According to another advantageous characteristic of the invention, the tarpaulin includes a zone that is covered in photovoltaic cells. By way of example, the zone may extend over the hood, the windscreen, the roof, and the rear trunk or tailgate.

In another advantageous aspect of the invention, on either side of the zone, the tarpaulin may form flexible side flaps for covering the sides of the vehicle. Preferably, each flexible side flap includes at least one ferromagnetic insert, and the vehicle includes stationary magnets in the proximity of the sill, so as to hold the side flaps pressed against the outer body. By way of example, the ferromagnetic insert may be in the form of a strip that extends along the edge of the tarpaulin. The stationary magnets may be permanent magnets or electromagnets. Thus, the tarpaulin is held against the outer body of the vehicle and is no longer subjected to wind.

In another aspect of the invention, the outer body includes heater means for heating the tarpaulin. The heater means make it possible to maintain the outer body at a temperature above freezing, thereby making it possible to wind it in. In addition, the vehicle is maintained at an agreeable temperature and it is no longer necessary to de-ice it. Naturally, the heater means may be powered by the photovoltaic cells present on the tarpaulin.

The spirit of the invention resides in holding the tarpaulin pressed against the outer body of the vehicle during the operation of putting the tarpaulin into place and the operation of removing the tarpaulin. The use of one or more movable magnets that move under the outer body along a longitudinal traction path makes it possible to achieve this object.

The invention is described more fully below with reference to the accompanying drawings which show two embodiments of the invention by way of non-limiting example.

In the figures:

FIG. 4 is a very diagrammatic view of the tarpaulin system of the invention;

FIG. 5 is a vertical section view through the rear portion of the vehicle, showing the system of the invention; and FIG. 6 is a diagrammatic view of the tarpaulin of the invention.

Figure 1:
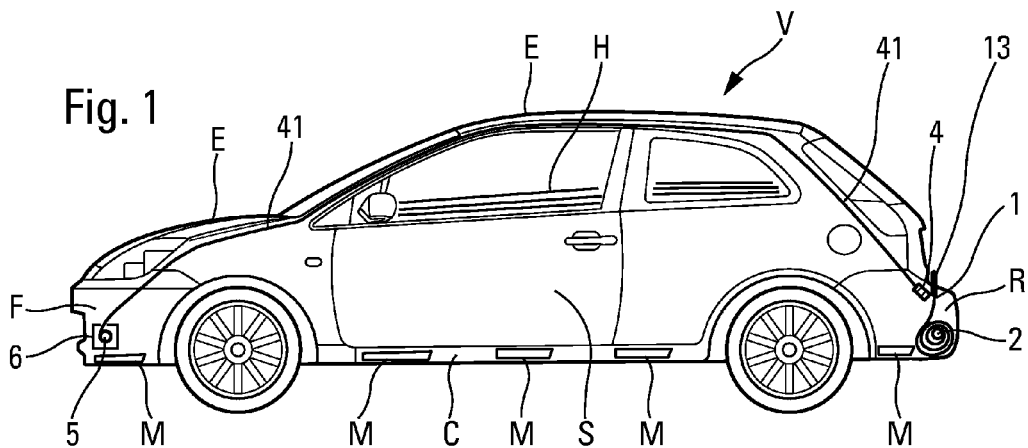
FIGS. 1 and 2 are side views of a vehicle fitted with a protective tarpaulin system of the invention, respectively with the tarpaulin removed and while the vehicle is being covered with the tarpaulin.
Figure 2:
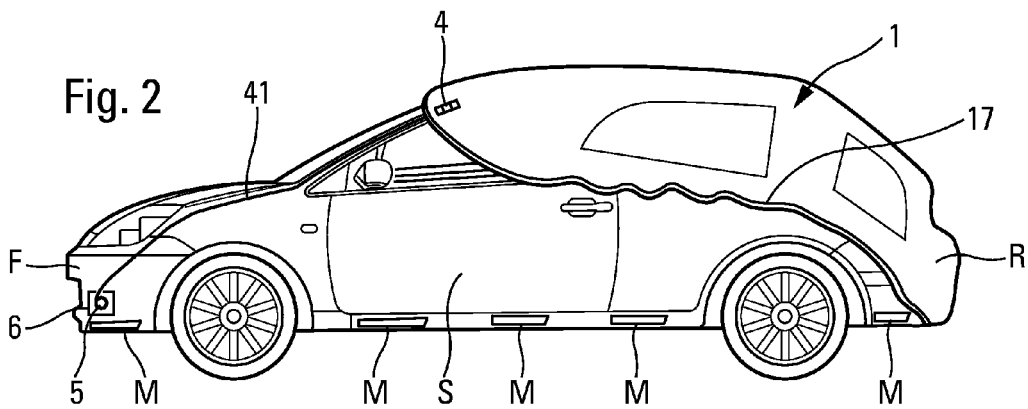

The protective tarpaulin system of the present invention is for associating with or incorporating in a motor vehicle, such as a privately-owned car or a commercial vehicle, a truck, a trailer, or even a boat. It is even possible to envisage using the tarpaulin system of the invention to cover other optionally-movable objects, and even structures, e.g. a pool, a swimming pool, etc. In FIGS. 1 to 6 that are used to illustrate the present invention, the tarpaulin system is incorporated in a motor vehicle of the privately-owned type. In conventional manner, the vehicle V comprises a sill C, a plurality of wheels, an engine, and a body. The vehicle V also comprises a rear bumper R, an outer body E, and a front bumper F, as can be seen in FIG. 1. The outer body E of the vehicle, for being covered with tarpaulin at least in part by the tarpaulin system of the invention, is constituted by the rear tailgate or trunk, the roof, the hood, the doors, and the fenders, and a portion of the rear and front bumpers. The tarpaulin system of the invention may cover all of the outer body E, with the exception of the wheels and a portion of the rear bumper. This is merely one non-limiting embodiment.

The tarpaulin system of the present invention comprises tarpaulin winding and unwinding means that are arranged in the rear bumper R, a tarpaulin 1 that is engaged with the winding and unwinding means, a winder that is arranged in the front bumper F, and at least one movable magnet 4 that is connected via a traction cable 41 to the winder of the front bumper F.

Figure 3:
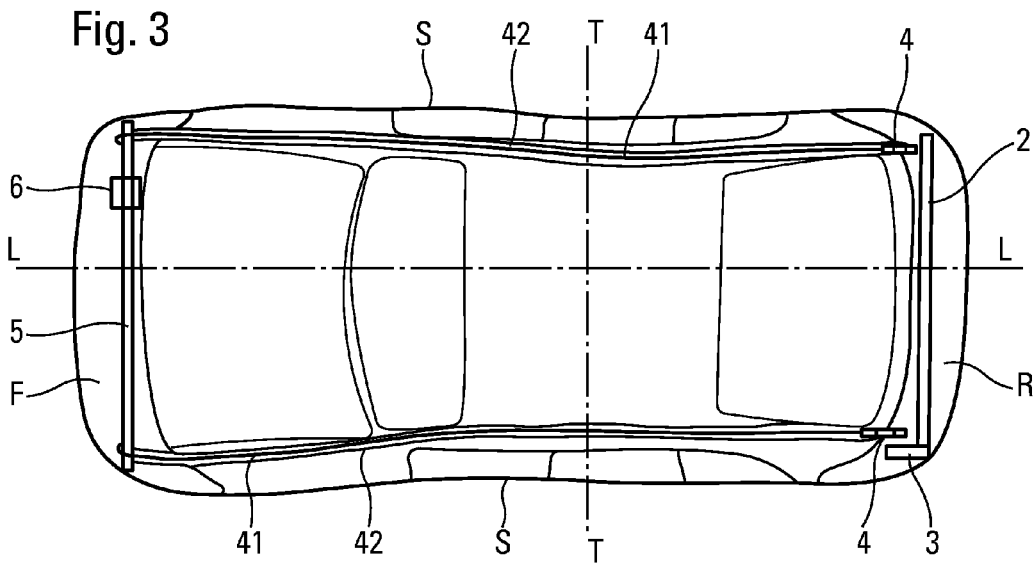
FIG. 3 is a plan view of the FIG. 1 vehicle.

As can be seen in greater detail in FIGS. 4 and 5, the tarpaulin winding and unwinding means comprise a rotary winding and unwinding drum 2 that is arranged parallel to the transverse direction T that extends over the width of the vehicle, as can be seen in FIG. 3. The rotary drum 2 is rotated by a motor 3 that is preferably an electric motor. The rotary drum 2 is housed in a casing 21 that defines an inside space that is sufficient to receive the wound tarpaulin 1. The rotary drum 2, its motor 3, and its casing 21 are housed entirely inside the rear bumper R, as can be seen in the figures. The rotary drum 2 is advantageously provided with two lugs 22 that support two parallel brush rollers 23, with a small gap between them, as can be seen in FIG. 5. At the outlet of the casing 21, the tarpaulin 1 passes between the two brush rollers 23 so as to be cleaned, in particular while it is being wound in. The tarpaulin 1 leaves the rear bumper R through an elongate slot 25 that is advantageously provided with a pivotable cover 24. It should be observed that the elongate slot 25 is arranged in the direct proximity of the outer body E of the vehicle. Thus, on leaving the rear bumper R, the tarpaulin 1 is arranged in the proximity of the outer body E. The tarpaulin may be urged towards the outer body E with the help of the cover 24 acting as a deflector.

The tarpaulin 1 of the invention can be seen in FIG. 6. It may be made from any flexible film or sheet that presents small thickness. Numerous materials, in particular plastics materials, are suitable for making a tarpaulin 1 of the invention. The dimensions (width, length) of the tarpaulin are adapted as a function of the size of the vehicle that it is to cover. By way of example, it is possible to provide a tarpaulin that is 5.60 meters (m) long and 3.80 m wide. The tarpaulin preferably includes a longitudinal central zone 14 that is advantageously provided with photovoltaic cells 15. The cells 15 are fully effective in sunlight, but also in shade providing there is some minimum amount of light. The zone 14 may extend over the hood, the windscreen, the roof, and the rear trunk or tailgate of the vehicle. On either side of the zone 14, the tarpaulin forms flaps 16 that may be more flexible than the zone 14 that is provided with photovoltaic cells 15. The flexible flaps 16 are for covering the sides of the vehicle, and in particular the fenders and the doors. The flaps 16 may also be provided with means of capturing solar energy, such as photovoltaic fibers for example. The tarpaulin 1 includes a connection edge 11 that is connected to the rotary drum 2 between the two lugs 22. It should be observed that the width of the zone 14 corresponds substantially to the spacing of the two lugs 22. Thus, the zone 14 winds onto the rotary drum 2 between the lugs 22, whereas the flexible side flaps 16 are wound onto the rotary shaft 2 on the outsides of the lugs 22. Given that the zone 14 is covered, at least in part, with photovoltaic cells 15, it presents relative stiffness that is greater than the stiffness of the flexible flaps 16. It is thus advantageous to wind the zone 14 around the drum 2 like a roller blind so as to avoid creasing it. It does not really matter if the flaps 16 become creased, since they are very flexible. The tarpaulin 1 also defines a free edge that is opposite from the connection edge 11. In the invention, the free edge 12 is provided with at least one traction element 13, and preferably two traction elements 13, as can be seen in FIG. 6. Each traction element 13 includes a ferromagnetic material such as iron, nickel, or cobalt. The traction elements 13 may be formed from a plurality of separate rigid pieces that are connected together in hinged manner. In a variant, the traction elements 13 may be made from flexible fabric made by weaving wires made of ferromagnetic material. Each traction element 13 may extend over a certain width of the tarpaulin. In the completely wound-in storage position, the traction elements 13 may be arranged and held between the two brush rollers 23, just below the elongate slot 25 of the rear bumper R. According to another advantageous characteristic, the periphery of the tarpaulin 1 is provided with at least one ferromagnetic insert 17 that extends at least in the side flaps 16. By way of example, the ferromagnetic insert may be in the form of a continuous ferromagnetic strip that is sewn into a peripheral hem of the tarpaulin. The strip is held pressed against the outer body E at the sill C of the vehicle that is advantageously provided with stationary magnets M that may be permanent magnets or electromagnets. Thus, the side flaps 16 of the tarpaulin are held pressed against the outer body E, even in the event of wind.

At the front bumper F, the winder includes a rotary shaft 5 that is arranged parallel to the rotary drum 2. The shaft 5 is driven in rotation about its own axis by a motor 6. Two traction cables 41 are provided, each being fastened at one of its ends to the rotary shaft 5, and, at their opposite ends, they include two respective movable magnets 4, each of which may be constituted by a string of a plurality of magnet segments. The cables 41 and the movable magnets 4 are arranged inside guide channels 42 that extend under the outer body E, along a traction path that extends from the front bumper to the rear bumper, via the elongate slot 25. The guide channels 42 are preferably pressed against the underside of the outer body E, so as to reduce the distance that separates them from the outer surface of the body E. By way of example, each guide channel 42 may extend from the front bumper F along the front fenders, beside the windscreen, along the roof, and along the rear fenders to the rear bumper R. The general direction of the guide channels 42 is longitudinal, as can be seen in FIG. 3. The movable magnets 4 are movable inside the guide channels 42 by winding the traction cables 41 onto the rotary shaft 5 driven by the motor 6. In the completely wound-out position shown in FIG. 5, the movable magnets 4 are arranged under the outer body E in the direct proximity of the longitudinal slot 25 of the rear bumper R. Thus, on the traction elements 13 leaving the rear bumper R through the elongate slot 25, they are attracted by the movable magnets 4 and as a result are pressed against the outer body E. The tarpaulin 1 is thus engaged with the movable magnets 4. It thus suffices to actuate the two motors 3 and 6 in coordinated manner, e.g. by means of an automatic controller (not shown), so as to pull the magnets 4 through the guide channels 42 by means of the traction cables 41, so as to wind out the tarpaulin 1 that is held pressed against the outer body 2 and that is guided longitudinally by the magnets 4. It is necessary to co-ordinate the two motors 3 and 6 so as to avoid separating the traction elements 13 from the movable magnets 4. The operation of putting the tarpaulin into place thus continues until the traction elements 13 reach the front bumper F. The vehicle is thus completely covered with tarpaulin, with the photovoltaic cells being deployed on top of the vehicle, and with the side flaps 16 surrounding the sides of the vehicle. The tarpaulin 1 is thus held in place on the vehicle firstly by the movable magnets 4, and secondly by the stationary magnets M that are provided in the sill and that co-operate with the ferromagnetic strip 17.

During the operation of removing the tarpaulin, the motors 3 and 6 are once again operated in coordinated manner, so that the traction elements 13 remain in magnetic engagement with the movable magnets 4. To do this, the rotary shaft 5 must be driven in such a manner as to maintain the traction cables 41 with no or very little tension. The movable magnets 4 no longer perform a traction function, as during the operation of putting the tarpaulin into place, but merely a longitudinal guiding function, so that the tarpaulin winds properly onto the rotary drum 2, without being laterally offset. Once the operation of removing the tarpaulin has been performed, the tarpaulin has returned to the configuration shown in FIG. 5.

Another optional characteristic of the present invention is to provide heater means H, e.g. over the side and/or rear windows, so as to heat the tarpaulin 1 to a temperature above freezing. Thus, the tarpaulin 1 may be wound onto the rotary drum 2 without being covered in frost or snow. Passing the tarpaulin between the two brush rollers 23 makes it possible to guarantee that the tarpaulin is properly cleaned in its wound-in storage state. The heater means H also make it possible to maintain the cab inside the vehicle at an agreeable temperature. The photovoltaic cells 15 of the zone 14 may provide at least a fraction of the energy required by the heater means H. The solar energy captured by the photovoltaic cells 15 of the zone 14 makes it possible to charge the battery of an internal combustion engine, of an electric motor, or of a hybrid vehicle, for example.

The present invention is illustrated by means of an embodiment that uses two movable magnets 4, two traction elements 13, and two traction cables 42. However, it is possible to envisage other embodiments with a single magnet 4, or, on the contrary, more than two magnets.

By means of the invention, during the operation of putting a tarpaulin into place and/or the operation of removing a tarpaulin, the flexible tarpaulin is guided longitudinally by magnetic means that are not visible, since they are arranged under the outer body of the vehicle.

The invention claimed is:

1. A motor vehicle (V) defining a longitudinal direction (L) that extends over the length of the vehicle between a rear bumper (R) and a front bumper (F), the vehicle including an outer body (E) that extends substantially from one bumper to the other starting from a sill (C), the vehicle also being provided with a protective tarpaulin system comprising a flexible tarpaulin (1) for covering the outer body (E) of the vehicle (V) at least in part so as to protect it, the system further comprising a winding drum (2), advantageously installed at the rear bumper (R) of the vehicle, the tarpaulin (1) being windable around the drum (2) between a wound-in storage position and a wound-out position, the tarpaulin (1)

including a connection edge (11) that is secured to the drum (3), and an opposite edge (12) that is free;

the motor vehicle being characterized in that:

the free edge (11) of the flexible tarpaulin (1) includes at least one traction element (13) made of ferromagnetic material, and the vehicle (V) includes at least one movable magnet (4) that is movable under the outer body (E) along a traction path that extends in the longitudinal direction (L), the movable magnet (4) attracting the traction element (13) of the tarpaulin (1) through the outer body (E) and entraining the traction element (13) of the tarpaulin (1) along the traction path, so as to bring the tarpaulin (1) into the wound-out position of the tarpaulin by sliding over the outer body (E).

2. A vehicle according to claim 1, wherein the traction element (13) is flexible.

3. A vehicle according to claim 1, wherein the movable magnet (4) is connected via a traction cable (41) to a winder (5, 6) that is advantageously arranged at the front bumper (F).

4. A vehicle according to claim 3, wherein the movable magnet (4) remains secured to the traction element (13) while the traction element is being wound onto the drum (2), with the traction cable (41) relaxed or under a small amount of tension.

5. A vehicle according to claim 1, including a guide channel (42) in which the movable magnet (4) is moved, the guide channel (42) extending under the outer body (E) of the vehicle, in its direct proximity.

6. A vehicle according to claim 1, wherein the outer body (E) is non-ferromagnetic, advantageously being made out of aluminum or out of plastics or composite material.

7. A vehicle according to claim 1, wherein the tarpaulin (1) includes a zone (14) that is covered in photovoltaic cells (15).

8. A vehicle according to claim 7, wherein, on either side of the zone (14), the tarpaulin (1) forms flexible side flaps (16) for covering the sides of the vehicle (V).

9. A vehicle according to claim 8, wherein each flexible side flap (16) includes at least one ferromagnetic insert (17), and the vehicle (V) includes stationary magnets (M) in the proximity of the sill (C), so as to hold the side flaps (16) pressed against the outer body (E).

10. A vehicle according to claim 1, wherein the outer body (E) includes heater means (H) for heating the tarpaulin (1).

11. The motor vehicle according to claim 1, wherein the motor vehicle is a car.

* * * * *